United States Patent Office 2,862,914
Patented Dec. 2, 1958

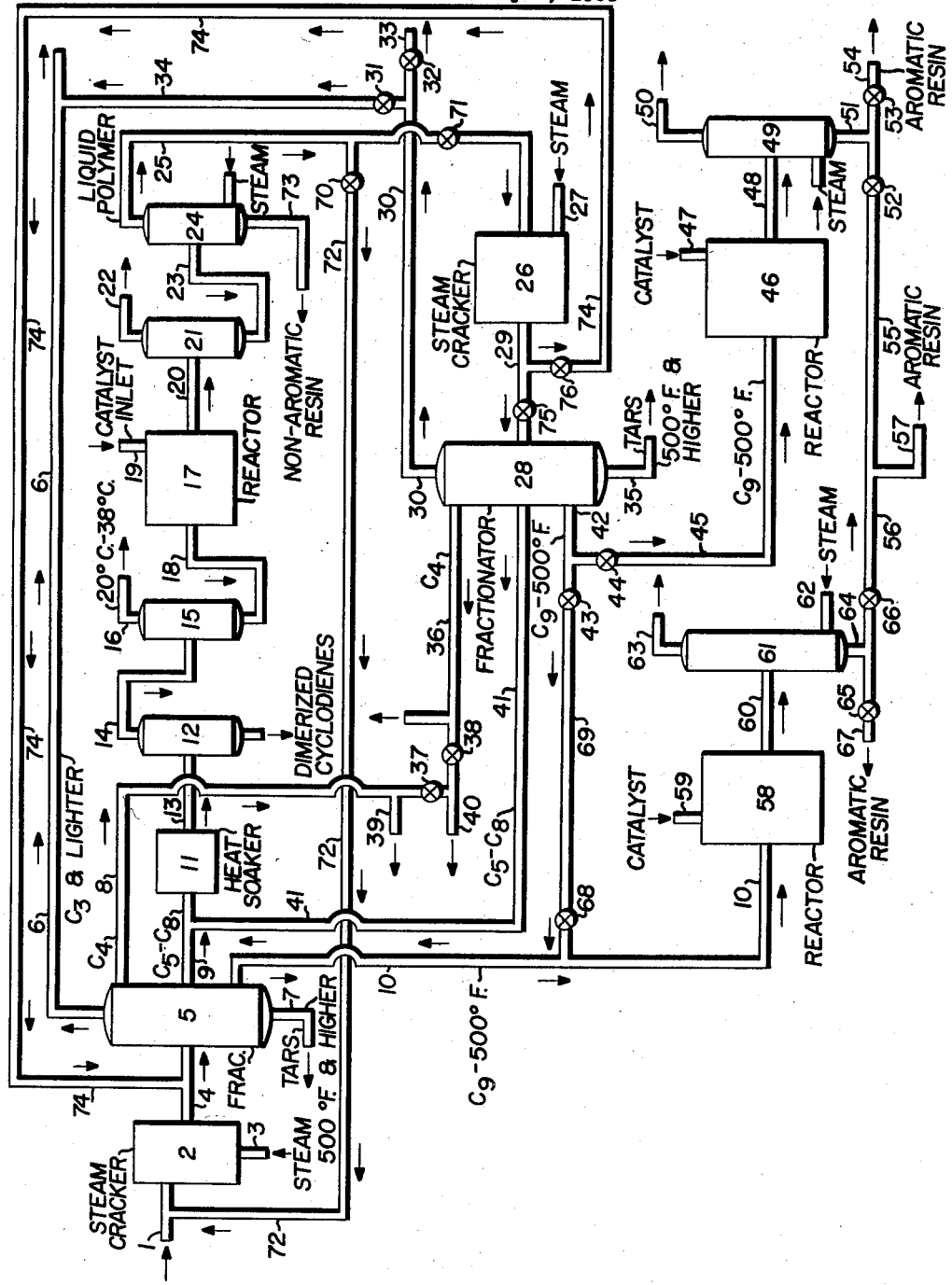
Robert F. Leary
James V. Fusco  Inventors
By W. H. Smyers  Attorney

2,862,914

PROCESS FOR PREPARING AROMATIC HYDROCARBON RESIN

Robert F. Leary, Cranford, and James V. Fusco, Fanwood, N. J., assignors to Esso Research and Engineering Company, a corporation of Delaware Application May 2, 1955, Serial No. 505,210

7 Claims. (Cl. 260—82)

This invention relates to novel resins and processes for making such resins by the polymerization of certain olefinic mixtures obtained by steam cracking operations. In one aspect, the invention is concerned with obtaining highly aromatic resins of improved softening points and iodine numbers with the ancillary production of certain other components which are especially suitable for producing chemicals, rubbers, drying oils, etc.

The invention will be explained below with references to the drawing in which:

The single figure is a diagrammatic representation of apparatus suitable for the present invention.

In the preparation of essentially non-aromatic resins from petroleum fractions boiling between about 20° C. to about 140° C. obtained from cracking operations, from about two to about ten weight per cent or more of "liquid-polymer" boiling between about 350–800° F. has been produced which has been discarded since it had heretofore found no commercial use. Such an essentially non-aromatic resin as the above, is predominantly the Friedel-Crafts catalyzed reaction product of olefins with multiolefins at about —70° C. to about +100° C., preferably at about —40° C. to about +70° C. and has an aniline point of about 160° F. to about 350° F., advantageously about 200 to 300° F. In the production of the above non-aromatic resin, the polymerization feed optionally contains various amounts of non-reactive aromatics, i. e. aromatics which do not react to form resins. However, this polymerization feed is generally substantially free from reactive aromatics such as vinyl aromatics and/or indene type materials and the resin is likewise substantially free from resinous reaction products of olefins and/or multiolefins with vinyl aromatics and/or indene type materials.

By the present invention the beforementioned liquid polymer which contains about 20 to 50 weight per cent aromatic hydrocarbons probably derived from alkylation of the aromatics in the feed, and which was heretofore considered to be a worthless polymerized component, is first-steam cracked and then converted by polymerization into new and valuable highly aromatic resins having improved softening points and iodine numbers. Also, increased yields of various other fractions which are rich in valuable chemicals such as benzene and toluene and/or intermediates for the production of other chemicals are produced. The resin of the present invention, produced as hereinafter indicated is essentially a highly aromatic material having an aniline point of between about 0 and 150° F., advantageously between about 10 and 100° F., a softening point of between about 100° C. and 150° C. or higher, an iodine number of below about 100 centigrams per gram (cg./g.), and especially between about 10–50 cg./g.; and contains substantial quantities of reaction products of vinyl aromatics and/or indene type materials with olefins and/or multiolefins.

In another aspect of the present invention, said above hitherto uncommercial liquid polymer is steam-cracked alone or in admixture with an original steam cracked feed for an essentially non-aromatic resin. The steam cracked products are then distilled into a plurality of fractions, and at least one of said fractions is subjected to polymerization to produce an aromatic resin having an iodine number below 100 and a softening point above 100° C.

In one embodiment of the present invention, the liquid polymer, which is a material boiling between about 350 and 800° F., is steam cracked at about 1000 to 1500° F., and a fraction boiling between about 250 and 500° F. is recovered from the cracked products. This latter fraction is then polymerized preferably alone or alternatively in admixture with a fraction boiling between about 250 and 500° F., obtained from the primary fractionator for handling the steam cracked materials produced in the primary steam cracking of virgin feed stocks.

The polymerization is in either a batchwise or a continuous manner employing a Friedel-Crafts catalyst such as boron trifluoride and especially an aluminum halide catalyst of a concentration of about 0.5 to 10%, advantageously about 1.0 to 5.0%, at about —50° C. to about +200° C., especially at about —40° C. to about +170° C., under conditions of good agitation. The essentially aromatic-resin thus formed may be recovered by water and/or alkali washing to remove catalyst, followed by stripping of the unpolymerized material. The catalyst also may be removed in any other desired manner such as adding an alcohol to form a solid $AlCl_3$ complex which is then filtered off.

In another aspect, the present invention constitutes an improvement in the manufacturing of both aromatic and non-aromatic petroleum hydrocarbon resins from cracked distillates since in applicants' production of hydrocarbon resins, at least two different resins may be consecutively or simultaneously produced; one of the resins being essentially aromatic in character and the other resin being essentially non-aromatic in character. The respective resins are advantageously produced in two or more reactors advantageously containing a Friedel-Crafts type catalyst such as a boron trifluoride containing catalyst or preferably an aluminum halide containing catalyst, in a finely divided state, slurry or solution. The over-all process also incidentally may produce at least one series of fractions by distillation, some of which fractions have a relatively high liquid aromatic content (i. e. liquid aromatics which are non-reactive with olefins and/or multiolefins) from which such materials as chemically pure benzene and toluene may be recovered.

Both the aromatic and non-aromatic resins produced may be employed in coating compositions including natural or synthetic drying oils, in the preparation of floor tile, as rubber compounding ingredients, and in printing ink formulations, etc. However, the aromatic-type resin is particularly desirable for floor tiles because of its higher "blocking temperature."

In one specific instance, petroleum fractions such as kerosene, gas oil, naphtha, etc, are cracked in the presence of steam (advantageously about 70–90 mol of steam) at temperatures above about 1000° F. up to about 1500° F. (preferably about 1100–1400° F.) to give unsaturated product streams. A liquid cut boiling mostly below about $C_9$ but containing small amounts of components up to $C_{11}$ may be segregated and heated at about 90 to 140° C. to dimerize some or all of the cyclodienes and, if so, about a $C_8$ to $C_9$ and lighter liquid cut would also be taken overhead to separate dimer concentrates advantageously as bottoms. The overhead stream which has been optionally substantially freed of cyclodienes, may then be optionally fractionated to remove at least some or all of the isoprene containing fraction boiling below 38° C. to recover isoprene for butyl-rubber manufacturing.

The resulting stream is then employed as the polymerization feed for making the two above-mentioned non-aromatic type of resins.

Table I below, shows one general set of specifications for such feed streams, showing both distillation ranges and chemical composition. Table II then shows the compositions of typical feed streams in which steam-cracked naphtha samples B, C, D, F, and G represent desirable feed streams for use in producing essentially non-aromatic resins. Feed stream samples A and E are not as desirable naphthas for the preparation of the essentially non-aromatic type of resin, but are highly advantageous for producing liquid-polymer which is then subsequently converted into applicants' highly aromatic resins of improved characteristics as will be later described.

TABLE I

*Specifications for resin feed streams*

[Boiling range 20–140° C., predominantly 30–130° C. and containing 15–30 wt percent or less boiling below 38° C. 5–10 wt. percent or less isoprene.

| Distillation range: | Weight percent |
|---|---|
| I. B. P.–38° C | 0–30 |
| 38–70° C | 20–60 |
| 70–130° C | 30–70 |
| 130° + | 0–10 |
| Preferred Composition: | |
| Diolefins (conjugated) | 10– 30 |
| Isoprene | 0– 5.0 |
| Piperylene | 5–15.0 |
| Cyclodienes | 0– 5.0 |
| Other diolefins | 1–10.0 |
| Aromatics | 10– 65 |
| Benzene | 10– 40 |
| Toluene | 1– 20 |
| C₈ aromatics | 0– 5 |
| Paraffins | 0– 5 |
| Olefins | 30– 80 |

The diolefin content of the above mixture was determined by reacting a mixture of 1.5 to 3.0 ml. of sample and 2.5 ml. of chloromaleic anhydride (diluted with 2 ml. benzene containing 0.1% tertiary butyl catechol) for 3 hours at 100° C., and steam distilling the resulting reaction mixture for 2 hours to recover HCl (1 mole/mole of diolefin).

The above selected feed streams may be polymerized in either a batchwise or continuous manner with a Friedel-Crafts catalyst such as boron trifluoride and especially with an aluminum halide catalyst of a concentration of about 0.5 to 10%, advantageously about 1.0–5.0% at about −40° C. to about +70° C., advantageously at about 0° to +60° C., under conditions of good agitation. The essentially non-aromatic resin thus formed may be recovered by water and/or alkali washing to remove catalyst, followed by stripping off the unpolymerized material. One good way to remove the catalyst is to add methyl alcohol to form a solid complex with AlCl₃, which is then filtered off. However, other methods for removing the catalyst from the polymerized products may be used.

The washed resin solutions are then stripped of unreacted hydrocarbons boiling up to the end point of the feed naphtha, about 140° C. The resulting crude resin concentrate is then stripped under vacuum or with steam to remove liquid polymer and to recover a solid resin product having a softening point of 80° C. or higher. Such a resin product, for example, might be obtained by stripping to a bottoms temperature of 260 to 270° C. at a pressure of 2 to 5 mm. Hg.

The yield of liquid polymer boiling between the hydrocarbon feed naphtha and the resin is dependent on the feed composition, catalyst concentration and temperature. It was formerly desirable that the yield of liquid polymer be held to 7% or less on the feed since it was considered to be essentially useless and represented a complete loss of feed components. By the present invention, the liquid polymer may range from about 1–20 weight percent or higher (generally about 2–10 weight percent), since the liquid polymer has been found to be a valuable starting material for the production of other highly aromatic resins as hereinafter indicated.

*Liquid polymer production.*—A series of comparative runs were carried out using feed stock as identified in Table II. In each experiment, 500 parts of unsaturated feed was agitated at 20° to 25° C. while 5 parts of powdered AlCl₃ was added over a period of 30 minutes. The agitation was continued for an additional 60 minutes at 45° C. after which the reactor contents were washed with 5% H₂SO₄ solution and then with water at temperatures of about 50° C. The naphtha was stripped off at atmospheric pressure and the remaining crude resin was stripped to a bottoms temperature of 270° C. at 2 to 5 mm. Hg. to give a light colored resin product. The data from this series of runs is tabulated in Table III below.

TABLE II

*Composition of typical resin feed streams for non-aromatic resins*

| Naphtha | A | B | C | D | E | F | G |
|---|---|---|---|---|---|---|---|
| Distillation, Wt. Percent Overhead: | | | | | | | |
| I. B. P. to 38° C | 29 | 13.5 | 3.5 | 3.9 | 17 | 8 | 0 |
| 38–70 | 28 | 32.5 | 39 | 39.9 | 22 | 25 | 31 |
| 70–130 | 42 | 53 | 54.5 | 52.7 | 59 | 64 | 69 |
| 130+ | 1 | 1 | 3.0 | 3.5 | 2 | 3 | <1 |
| Composition, wt. Percent: | | | | | | | |
| Diolefins | 18.2 | 19.4 | 16.2 | 15 | 14.5 | 14 | 19 |
| Isoprene | 7.0 | 3.1 | <1 | <1 | 4.0 | <1 | <1 |
| Piperylene | 6.9 | 8.8 | 9.8 | 8.3 | 7.5 | 8.3 | ------ |
| CPD's | 1.0 | 1.0 | 1.8 | 1.2 | 0.7 | 0.9 | <1 |
| Others | 3.3 | 6.5 | 4.6 | 3.5 | 2.3 | 4.8 | ------ |
| Aromatics— | | | | | | | |
| Benzene | 14.5 | 19.2 | 22.1 | 19.6 | 20 | 29.1 | 30 |
| Toluene | 5.7 | 7.4 | 8.1 | 4.2 | 9 | 6.8 | 8 |
| C₈ Aromatic | <1 | <1 | <1 | <1 | <1 | <1 | <1 |
| Paraffins | 2 | 3 | 3 | 1 | 1 | 1 | 2 |
| Olefins | 59.6 | 51 | 50.6 | 60.2 | 55.5 | 49.1 | 41 |

TABLE III

*Effect of I. B. P.–38° C. concentration on liquid polymer yield*

| Feed (Table II) | C | | B | | A | | |
|---|---|---|---|---|---|---|---|
| Wt. Percent I. B. P.–38° C. Fraction | 3.5 | | 13.5 | | 29 | | |
| Wt. Percent Isoprene on Feed | <1 | | 3.1 | | 6.7 | | |
| Percent AlCl₃ on Feed | 0.75 | 1.0 | 0.75 | 1.0 | 0.75 | 1.0 | 1.25 |
| Resin Yield, Wt. Percent | 35.2 | 37.1 | 35.7 | 35.9 | 32.2 | 31.5 | 31.5 |
| Liquid Polymer, Wt. Percent | 4.7 | 3.7 | 5.2 | 4.9 | 8.4 | 8.8 | 10.3 |
| Resin Soft. Pt., °C.[1] | 92 | 90 | 90 | 90 | 90 | 89 | 90 |
| Color[2] | 3 | 2 | 3 | 2 | 2 | 3 | 3 |
| Iodine No.[3] | 202 | 204 | 205 | 197 | 202 | | |

[1] Ring and ball softening point (ASTM E-28-51-T).
[2] Gardner Color Index, 1 g. resin/67 g. xylene.
[3] ASTM (D-555-47).

The above data show that feeds having 13.5 weight percent or less of the isoprene-containing fraction give resin yields of 35.2 to 37.1 weight percent at a resin softening point of about 90° C. In each case the yield of liquid polymer was about 3.7 to 5.2%. However, the feed (A) containing more than 15% of the isoprene-containing fraction gave slightly lower yields (31.5 to 32.2%) and also somewhat higher liquid polymer yields (8 to 10% or higher).

In either instance, the liquid polymer is subsequently processed according to the present invention to produce still further novel highly aromatic resins as hereinafter described, whereas by the processes of the prior art, the liquid polymer was heretofore discarded.

*Yield of liquid polymer and non-aromatic resins.*—The effects of temperature on the amount of liquid polymer and essentially non-aromatic resin are correlated below in Table IV. Aluminum chloride powder of 30 mesh is employed with a constant feed using reaction temperatures varying from —40° C. up to +50° C. Details are shown in Table IV. Temperatures of about 0° C. up to 50° C. give essentially non-aromatic resins having good qualities in every way with the amounts of liquid polymer as shown below:

TABLE IV

| Naphtha Feed (Table II) | D | | | |
|---|---|---|---|---|
| Catalyst | AlCl₃ Powder (30 mesh) | | | |
| Run No. | I | II | III | IV |
| Wt. Percent AlCl₃ on Feed | 1.0 | 1.0 | 1.0 | 1.0 |
| Catalyst Addition Time, min | 30 | 30 | 30 | 30 |
| Temperature, °C | 45-50 | 20-25 | 0 | -40 |
| Yields, Wt. Percent on Feed: | | | | |
| Non-Aromatic Resin | 32.5 | 32.2 | 29.8 | 18 |
| Liquid Polymer | 8.8 | 6.9 | 2.2 | 1.4 |
| Resin: | | | | |
| Softening Point, °C | 90 | 90 | 90 | 89 |
| Color | 2 | 3 | 3 | 2 |

Referring to the above table, temperatures below 0° C. give reduced yields of essentially non-aromatic resins (Runs III and IV) having good qualities and accompanied by smaller amounts of liquid polymer. By the process of the present invention, it is now possible to produce non-aromatic resins in higher yields (i. e. yields of about 30 weight percent or higher (Runs I and II). In addition, by using higher temperatures, the liquid polymer which is formed is converted into a valuable highly aromatic resin and other valuable chemical materials. Accordingly, it is no longer necessary to reduce the temperature to below 0° C. to about —40° C. in order to obviate the formation of substantial amounts of liquid polymer. For example, in the past, as shown in Table IV, a sacrifice of about 14% conversion (18% compared to 32%) in resin, with a re-run of unreacted reactants to produce more resin was required in order to obviate the complete loss of about 7.4% materials (8.8% minus 1.4% as shown in Table IV) as heretofore useless liquid polymer.

Reference is now made to the figure which is a diagrammatic representation of one embodiment of the present invention and in which there are represented a plurality of vessels, conduits and valves, it being expressly understood that some valves and other details, etc. have been intentionally omitted since they would be in conventional positions as readily understood by a person skilled in the art. Furthermore, as the description of the figure proceeds, only some of the possible alternative procedures will be mentioned, since it would not be practical to enumerate absolutely all of the equivalent alternatives and refinements thereof.

In said figure, numeral 1 indicates a feed line for a virgin petroleum fraction such as kerosene, heavy naphtha, and preferably a light gas oil, etc. The virgin feed stock is then passed to steam cracking unit 2 in which said virgin feed stock which generally has a boiling range between about 400° to 700° F. is cracked in the presence of steam at temperatures of about 1000° F., up to about 1500° F., and preferably between about 1100° to 1400° F. in the presence of about 70 to 90 mole percent steam which is introduced through steamline 3. The cracked products are then conveyed via conduit 4 to fractionating column 5 from which any number of desirable side streams as well as an overhead product and residuum are recovered. In one advantageous embodiment, the steam cracked distillate is fractionally distilled into five streams including an overhead product which emerges as effluent from the overhead conduit 6 of fractionating column 5, a residuum which emerges from the bottom conduit 7, and three sidestream products as hereinafter indicated.

As regards the overhead product which is recovered via conduit 6, about half of said overhead product is useful for recovering ethylene and propylene which may be sold as such. Alternatively, they may be used as intermediates in the production of such materials as polyethylene, ethyl alcohol, ethyl halides, ethylene oxides, isopropyl alcohols, etc. The next fraction desirably recovered from the fractionating column is essentially a C₄ cut and is taken from said fractionating column via sidestream conduit line 8. This sidestream product is likewise very rich in valuable materials and comprises about 50% of isobutylene and butadiene. The isobutylene is a valuable material for the following purposes: production of Butyl rubber which generally comprises the reaction product of isobutylene and a C₄-C₁₄ multiolefin; production of lubricating oil viscosity index improving additives such as polyisobutylene, production of plastics such as copolymers of isobutylene and styrene, etc. The butadiene recovered is valuable as a reactant, for the production of synthetic GR–S rubber which comprises among other materials a copolymer of said butadiene and styrene. Also, other valuable drying oils may be manufactured from butadiene including reaction products such as polybutadiene, and copolymers of a major proportion of said butadiene and a minor proportion of a vinyl aromatic such as styrene.

The two remaining fractions advantageously recovered from column 5 are as follows: A $C_5$–$C_8$ fraction which is suitable for the production of substantially non-aromatic hydrocarbon petroleum resins which is recovered via line 9, and a second fraction including $C_9$ hydrocarbons and higher boiling between about 250° F., and about 500° F. This latter material is recovered from the fractionating column via line 10 and is suitable for the production of certain highly aromatic hydrocarbon resins. These resins may be upgraded in quality by the admixture therewith of the highly aromatic hydrocarbon petroleum resin produced according to the present invention as subsequently more fully described.

The $C_5$–$C_8$ fraction from line 9 is then advantageously thermally soaked in heat soaker 11, although the heat soaking step may be omitted if desired. The $C_5$–$C_8$ fraction is then conducted to a vacuum distillation tower 12 via conduit 13, in which the cyclodienes, and particularly cyclopentadiene which has become dimerized, are removed as bottoms and an overhead product boiling in the range of about 20°–140° C. is recovered in the overhead product via line 14. In another optional but preferred embodiment, the material boiling between about 20° and 140° C. is passed to a fractionating tower 15 from which an overhead product boiling between about 20° and 38° C. (which is rich in isoprene suitable for Butyl rubber manufacture) is recovered via line 16. The bottoms from fractionating tower 15 are then conveyed to reactor 17 via conduit 18.

Reactor 17 is equipped with a catalyst inlet 19 through which a Friedel-Crafts catalyst such as aluminum chloride is injected. The olefinic feed stream is then subjected to polymerization in reactor 17 at temperatures of from about −40° C. to about +70° C., advantageously at about 0° C. to about +60° C., and the polymerized reaction mixture is passed through line 20 through various conventional catalyst removal zones (not shown) and subsequently conducted via a continuation of conduit 20 to atmospheric distillation tower 21. From this distillation tower 21, a $C_5$–$C_8$ overhead stream 22 of unreacted material is removed and can be utilized for isolating valuable aromatic components such as benzene and toluene and the like. The bottoms from distillation tower 21 comprise a crude resin fraction 23 which is passed to a second distillation tower 24 equipped for steam and/or vacuum distillation from which a "liquid polymer" boiling in the range of approximately 350° to 800° F. is removed as overhead stream 25 and the finished non-aromatic resin product is removed from distillation tower 24 via line 73 as bottoms. Distillation towers 21 and 24 may be combined into a single fractionating column if desired. The process may be operated either batchwise or in a continuous manner.

According to one embodiment of the present invention, the liquid polymer is subsequently passed via line 25 to steam cracking unit 26 supplied with about 60 to about 95 mole percent of steam, especially about 70 to 90 mole percent of steam by steam conduit 27. The steam cracking unit is operated under a pressure of about 0 to 30 p. s. i. g. or higher and preferably about 5 to 15 p. s. i. g. The liquid polymer may be optionally preheated up to about 900° F., advantageously to about 700°–850° F. The liquid polymer remains in the steam cracking unit for a contact time of between about 0.1 to 5 secs. and preferably between about 0.5 to 2 secs., and is cracked at a temperature between about 1000° and 1500° F., preferably between about 1100° and 1400° F. The hydrocarbon partial pressure at the cracking coil outlet is regulated at between about 5 and 30 p. s. i. a. and advantageously at between about 10 and 20 p. s. i. a. The steam-cracked liquid polymer is then fed to fractionating column 28 via conduit 29.

In fractionating column 28, about 5 product streams are recovered. One stream recovered from overhead product line 30 may comprise $C_3$ hydrocarbons and lighter constituents. Depending upon the chemicals present in said overhead product, by the appropriate adjustment of valves 31 and 32, the overhead product is either recovered separately via line 33 or reblended with the $C_3$ and lighter material from primary fractionator 5 via line 34 and collected together with said overhead product from said primary fractionator. Since in most instances, the $C_3$ and lighter stream recovered as overhead product from fractionating column 28 contain percentagewise even more valuable materials such as ethylene and propylene than are produced in the primary fractionating column 5, it is often advantageous to recover this stream separately from conduit 33 as above mentioned.

A second stream which may be recovered from primary fractionator 28 as bottoms and comprises a material boiling in the range of about 500° F. and higher, and is rich in tars. This bottoms which is recovered via residuum conduit 35 is optionally admixed with the tars obtained from primary fractionating column 5 depending on the various chemical constituents of the respective tar-containing streams. This blending of the tars is not shown in the figure for purposes of simplicity.

Another advantageous product stream recovered from fractionating column 28 is a stream particularly rich in $C_4$ hydrocarbons such as isobutylene and butadiene which may be conveyed via conduit 36 to be admixed with the $C_4$ stream recovered via line 8 from primary fractionator 5 and by the appropriate manipulation of valves 37 and 38 emerge via line 39 as an admixture of said two aforementioned $C_4$ hydrocarbon-containing product streams. Alternatively, the $C_4$ hydrocarbon-containing stream may be conveyed via conduit 36 and, by the appropriate manipulation of valves 37 and 38, recovered alone via line 40 and subsequently treated to recover the valuable isobutylene and butadiene and/or other valuable constituents.

The next product stream which it is advantageous to recover from fractionating column 28 is a $C_5$–$C_8$ stream which emerges via conduit 41. Since the said $C_5$–$C_8$ hydrocarbon-containing product stream is rich in olefins and multiolefins (particularly conjugated diolefins) and contains substantially no reactive aromatic hydrocarbons such as vinyl aromatics or indene-type hydrocarbons which will react to give resins. This $C_5$–$C_8$ stream is advantageously and preferably conveyed via conduit 41 to conduit 9 to be subsequently reacted by means of a Friedel-Crafts catalyst to produce a substantially non-aromatic hydrocarbon resin by direct injection (not shown) into reactor 17. If desired, the stream from conduit 9 may be first heat-soaked in soaker 11, stripped of cyclodienes in tower 12, and/or stripped of an isoprene-containing cut boiling between about 20° and 38° C. in tower 15 as shown in the drawing.

The remaining stream emerges from fractionating column 28 via line 42 and by the appropriate manipulation of valves 43 and 44 is preferably conducted via line 45 to polymerization reactor 46 which is charged through line 47 with a Friedel-Crafts catalyst, preferably of an aluminum halide type.

The above stream which boils bttween about 250° and 500° F. is polymerized by employing a solid aluminum chloride catalyst of a concentration of 1 to 5 weight percent based on the polymerization feed. The polymerization is conducted at about +50° C. under conditions of good agitation for one hour. The polymerized reaction mixture containing the improved aromatic resin of the present invention is then passed through a catalyst removal tower or towers (not shown) from which the catalyst is removed, for example, by washing with water. The polymerized stream is then taken via conduit 48 to atmospheric distillation tower 49. From this distillation tower, an overhead stream 50 is removed, which stream closely resembles a naphtha cut. Alternatively, the distillation tower 49 may be run under vacuum and/or steam as shown. The aromatic resin is removed as bottoms via line 51 and by suitable manipulation of valves 52 and 53, may in one advantageous embodiment be recovered via line 54.

Some of the other alternative embodiments which are within the purview of the present invention are as follows: As regards the product streams from fractionating column 28, the $C_5$-$C_8$ stream may be conducted to a separate polymerizing system comprising a Friedel-Crafts polymerization zone or reactor and various optional ancillary equipment such as a heat-soaker, isoprene stripper, etc. (not shown). Also, the $C_5$-$C_8$ stream may in another alternative embodiment be conducted directly to either conduits 13, 14 or 18 by means of suitable piping not shown in the drawing.

Also, the aromatic resin of the present invention may, by suitable manipulation of valves 52 and 53, be conducted via conduit 51 to line 55 and admixed with an aromatic resin of somewhat inferior quality available in line 56 which has been produced from a $C_9$—500° F. cut from primary fractionating column 5 withdrawn therefrom via conduit 10. In this embodiment, this $C_9$—500° F. cut is conducted via conduit 10 to reactor 58 wherein the polymerization reaction occurs in the presence of a Friedel-Crafts catalyst injected into said reactor via catalyst inlet line 59, substantially at the conditions described with reference to reactor 46. The polymerized stream 60 is then taken to a distillation tower 61 which is operated under atmospheric conditions or vacuum and in an optional embodiment supplied with steam via steam conduit 62. From distillation tower 61, an overhead stream 63 may be recovered separately, or subsequently admixed with the overhead product emerging from distillation tower 49 via conduit 50 by means of suitable piping not shown in the drawing. The overhead stream 63 is a fraction which is very similar in characteristics to a naphtha cut. The bottoms fraction which is an aromatic resin is then passed via conduit 64 by means of valves 65 and 66 to either line 56 or 67.

In an alternative embodiment, by means of closing valve 44 and opening valves 43 and 68, the $C_9$—500° F. product stream from fractionating column 28 is conveyed via line 42 to conduit 69 and is admixed with the $C_9$—500° F. cut from fractionating column 5 emerging via conduit 10. This admixture is then charged to reactor 58 and conducted to distillation tower 61 via line 60 and recovered through conduit 64 to line 67 by means of closing valve 66 and opening valve 65.

In another embodiment, the liquid polymer from distillation tower 24 is conveyed, via line 25 and by means of suitable manipulation of valves 70 and 71, to conduit 72 and admixed with the feed to steam cracker 2 in line 1. In this embodiment, there is the advantage of some savings in heat losses, etc. However, the aromatic resin produced is not of as high a quality as if the feed to be steam-cracked is entirely liquid polymer. In the above embodiment, a sidestream is recovered from primary fractionating column 5 via conduit 10 and polymerized in reactor 58 and treated in distillation tower 61, and the aromatic resin is recovered through line 64 to conduit 67. This resin is an admixture of the aromatic resin obtained from the steam cracked $C_9$—500° F. cut of the original raw material feed and the added cracked liquid polymer. This admixture is a higher quality aromatic resin than that obtained from the original $C_9$—500° F. cut alone, but is of a lower quality than the aromatic resin obtained from the cracked liquid polymer alone.

In still another embodiment, the steam-cracked products leaving steam cracker 26 via conduit 29 are conveyed to conduit 74 by means of suitable manipulation of valves 75 and 76. This steam-cracked product is then advantageously conducted via conduit 74 abovementioned to line 4 as feed to primary fractionating column 5. This procedure has the advantage of the elimination of fractionating column 28 with the attendant savings in costs but has the disadvantage of producing a somewhat inferior aromatic resin. This is because the steam-cracked liquid polymer is admixed with steam cracked virgin material, the steam-cracked liquid polymer alone which produces an aromatic resin which is not as high quality as the aromatic resin which is obtainable from the steam-cracked liquid polymer alone.

In order to demonstrate the superiority of the aromatic resin obtainable from line 54, as a product derived exclusively from a steam-cracked liquid polymer having a boiling range of about 350° to 800° F. (which polymer is the Friedel-Crafts polymerization product obtained in conjunction with a hydrocarbon petroleum resin from a $C_5$-$C_8$ steam-cracked petroleum stream, preferably boiling between about 400°–700° F.), over the aromatic resin obtained exclusively from line 67 from material processed via conduit 10 of primary fractionator 5 to reactor 58, conduit 60, distillation tower 61, conduit 64, the following additional experiments were made.

EXAMPLES I–II

The particular sample of liquid polymer used in these experimental runs had a boiling range of 380° to 800° F., an average molecular weight of 365, a gravity of 30.3° A. P. I., and an aromatic content (by silica gel percolation) of 38%.

Two runs were made in a steam-cracking unit operated under the following conditions:

TABLE V

*Cracking of liquid polymer*

| Operating Conditions For— | Example I (S–1) | Example II (S–2) |
|---|---|---|
| Mole Percent Steam | 86.5 | 85.8 |
| Contact Time, seconds | 0.5 | 1.0 |
| Pressure, p. s. i. g. | 8 | 8 |
| Temperature, ° F., Preheater | 780 | 780 |
| Coil Outlet Temperature, ° F. | 1,395 | 1,390 |
| Coil Outlet Hydrocarbon Partial Pressure, p. s. i. g. | 14 | 14 |
| Wt. Percent Conversion to $C_3$ and Lighter Products | 32.3 | 36.8 |

The two resulting steam cracked products (S–1 and S–2) were then distilled. A third sample (S–3) of steam cracked products was obtained by steam cracking virgin gas oil boiling at about 400° to 700° F., of the same origin from which the above liquid polymers were produced. The sample S–3 (infra) was also distilled to separate out lighter fractions in the same way as S–1 and S–2.

The relative amounts of the overhead fractions obtained by distillation of these three steam cracked samples are shown in the following table:

TABLE VI

| Overhead Fraction | Example I (S-1) | Example II (S-2) | S-3 |
|---|---|---|---|
| Benzene, wt. percent on feed | 4.2 | 4.3 | 2.5 |
| Toluene, wt. percent on feed | 5.5 | 7.4 | 2.2 |
| $C_9$—500° F., wt. percent on feed | 22.4 | 22.3 | 9.0 |

The two $C_9$—500° F. distillates S-1 and S-2 were then polymerized in reactors similar in type to reactor 46 and the $C_9$—500° F. distillate S-3 in a reactor similar in type to reactor 58 and recovered separately. In each instance the polymerization was accomplished in the presence of 2 wt. percent of solid aluminum chloride catalyst (based on the weight of the feed). The polymerization was for 60 minutes at 40° C. under conditions of good agitation, and the resulting resin which was recovered by washing with water and which after decanting the water had been stripped of unreacted material by distillation and dried, had the characteristics tabulated:

TABLE VII

| Resin From $C_5$-900° F. Distillate From Sample | Example I (S-1) | Example II (S-2) | S-3 |
|---|---|---|---|
| Softening Point, ° C | 138 | 109 | 90 |
| Yield of Resin (Wt. Percent on Feed to Cracker) | 8.4 | 6.5 | 3.3 |
| Aniline Point, ° F | 95 | 32 | 50 |
| Iodine No. cg./g | 49 | 28 | 153 |

From the above, it can be seen that by steam cracking liquid polymer (as in Examples I and II) which was heretofore considered worthless, not only are there greater yields of benzene and toluene obtainable (Table VI) than heretofore (as in S-3), but also there is at least double the amount of $C_9$–500° F. distillates available for producing valuable aromatic petroleum resins (see Table VI). Furthermore, the aromatic resin produced is of superior softening point, is in superior yields, and has a lower iodine number (see Table VII) which renders it more stable as to resistance to oxidation on aging and more resistant to discoloring and embrittlement.

The aromatic resin of the present invention may be lightened in color by hydrogenation generally according to the processes disclosed in U. S. application Serial No. 279,933 filed April 1, 1952, or U. S. application Serial No. 491,225 in the name of Augustus B. Small, filed February 28, 1955. The hydrogenation is preferably accomplished in a solution of the resin in an inert hydrocarbon diluent such as hexane, straight run mineral spirits, etc., under a pressure of about 100–5,000 p. s. i. g., advantageously about 500–3,000 p. s. i. g., at temperatures of about 100°–750° F. and preferably about 300°–500° F. for a few minutes up to about 30 hours or more, preferably about 1–15 hours in the presence of about 2–50 wt. percent based on the resin of any suitable hydrogenated catalyst such as group VI and VIII metals and compounds such as nickel, cobalt molybdate, nickel sulfide, reduced nickel, copper chromite, alone or supported on granular particles such as alumina, pumice, clays, charcoal, etc. If the hydrogenation is continuous, the feed rate of resin through the catalyst bed should be about 0.1 to about 5.0 volumes of liquid feed per volume of reactions per hour.

One particularly advantageous use for the highly aromatic resin of the present invention is in preparing compositions which may be compounded with various pigments and fillers to produce floor tiles. Also, another use of the aromatic resin of the present invention is in the production of floor tiles, as will be more fully described hereinafter.

In the production of compositions suitable as base stock for producing floor tiles in which various amounts of fillers are added and in some instances pigments also are incorporated, the base stock material may comprise about 100 parts by weight of the aromatic resin of the present invention and about 5–200 parts by weight of an asphalt, pitch (to include such materials as stearine pitch), tars or mixtures thereof, etc. For example, asphalt per se or asphalt admixed with various quantities of pitch or tar have been found to be particularly desirable. This is especially noticeable when the asphalt is present in composition in greater percentages by weight than either the pitch or tar. Also, in a three-component composition including asphalt, pitch and tar, it is optional but preferable to employ the asphalt in greater quantities than the combined quantity of both pitch and tar.

Suitable compositions illustrative of the foregoing are listed below:

TABLE VIII

| Composition No. | Parts by Weight | | | |
|---|---|---|---|---|
| | Aromatic Petroleum Resin | Asphalt | Pitch | Tar |
| 1 | 95 | 5 | | |
| 2 | 90 | 5 | | |
| 3 | 90 | | 10 | |
| 4 | 90 | | 5 | 5 |
| 5 | 50 | 50 | | |
| 6 | 50 | | 25 | 25 |
| 7 | 50 | 20 | 20 | 10 |
| 8 | 30 | 70 | | |
| 9 | 30 | 30 | 20 | 20 |
| 10 | 30 | | 70 | |
| 11 | 30 | | | 70 |

The following is an advantageous composition suitable for producing floor tiles:

TABLE IX

| Material | Range, Parts by Wt. | Preferred, Parts by Wt. |
|---|---|---|
| Aromatic Petroleum Resin | 10–35 | 20 |
| Plasticizer | 2–20 | 10 |
| Filler | 30–80 | 60 |
| Pigment | 0–15 | 10 |

In the above table, the aromatic resin may be employed within the range as indicated, but it is preferred to maintain the amount of resin within the range of about 15–25 parts by weight in most floor tile applications. As regards the plasticizer, this material may comprise the various asphalts, pitches, or tars, combinations thereof, etc., as above mentioned. The pigment is preferably of the inorganic type to include such materials and equivalents to titanium dioxide, chromium green, ultra-marine blue, zinc chromates, lead oxides, calcium carbonate whiting, red iron oxides, etc.

Insofar as the selection of the various fillers is concerned, these may be substantially any commercially known fillers used in floor tiles such as comminuted asbestos, marble dust, clays, ground limestone, ground sand, mixtures of these materials, etc. It has been found that the use of comminuted asbestos is particularly desirable and although the other various materials listed will accomplish the purpose, comminuted asbestos, either alone or in combination with one or more of the other materials or their equivalents is preferred.

EXAMPLES III–XVI

Examples of the above floor tile compositions are now tabulated:

TABLE X

| Example | Aromatic Resin (By Weight) | Plasticizer | Amount of Plasticizer (By Wt.) | Pigment | Filler(s)[1] | Ratio if more than one Filler |
|---|---|---|---|---|---|---|
| III | 10 | asphalt | 20 | 3TiO$_2$ | asbestos / marble dust | 60 / 10 |
| IV | 35 | pitch | 2 | 2 zinc chromate | limestone | |
| V | 10 | tar | 2 | | asbestos / limestone | 35 / 25 |
| VI | 35 | asphalt / tar | 10 / 10 | 6-red iron oxide | asbestos / sand | 45 / 30 |
| VII | 20 | asphalt / pitch | 6 / 4 | 2TiO$_2$ | asbestos / marble dust / limestone | 5 / 2 / 2 |
| VIII | 30 | asphalt | 15 | 8-red iron oxide | asbestos / marble dust | 1 / 1 |
| IX | 15 | asphalt / tar | 10 / 10 | 5-marine blue | tar | |
| X | 30 | pitch / tar | 3 / 2 | | marble dust | |
| XI | 10 | asphalt | 15 | white-lead-oxide | asbestos / marble dust | 2 |
| XII | 20 | asphalt / pitch / tar | 5 / 3 / 2 | 3TiO$_2$ | asbestos / marble dust | 3 / 1 |
| XIII | 20 | asphalt | 10 | 3-red iron oxide | asbestos / limestone | 1 / 1 |
| XIV | 10 | do | 10 | 3-TiO$_2$ | asbestos | |
| XV | 30 | do | 10 / 5 | 3-TiO$_2$ | do | |
| XVI | 10 | asphalt / pitch | 3 / 3 | 3-TiO$_2$ | do | |

[1] The amount of filler corresponds to the balance in parts by weight to total 100 parts by weight of floor tile composition.

The above mixtures are milled in a Banbury mixer, heated to plasticity (for example, above 100° C. but at a temperature insufficient to scorch composition), optionally but preferably compressed or otherwise fabricated into a sheet and regulated in thickness by any conventional means such as one, or preferably more than one, calender roll, cooled and cut to size to produce a floor tile as desired.

While there are above described a number of specific embodiments of the present invention, it is obviously possible to produce still other embodiments and various equivalent modifications and variations thereof without departing from the spirit of the invention or the scope of the appended claims.

What is claimed is:

1. A process for making a highly aromatic hydrocarbon resin having an iodine number of approximately 10 to 100, a softening point above approximately 100° C., and an aniline point of between about 0° to 150° F., which comprises the steps of steam-cracking at about 1000° F. to 1500° F. a virgin petroleum fraction boiling in the range of about 400° to 700° F., distilling from the cracked virgin petroleum fraction a hydrocarbon fraction boiling in the range of 20° to 140° C., reacting said hydrocarbon fraction with a Friedel-Crafts catalyst at a temperature taken from the range approximately −40° to +70° C. to produce a substantially non-aromatic resin and a liquid polymer containing 20 to 50% aromatic hydrocarbons and boiling in the range about 350° to 800° F., distilling said liquid polymer from said non-aromatic resin, cracking said liquid polymer in the presence of 70 to 90 mole percent steam at 1000° to 1500° F. to produce a highly aromatic fraction boiling in the range about 250° to 500° F., and reacting said highly aromatic fraction with about 1 to 5 wt. percent, based on said highly aromatic fraction, of AlCl$_3$ at a temperature of about −40° to +170° C. to produce the highly aromatic hydrocarbon resin having a softening point above 100° C.

2. A process for producing an improved light colored highly aromatic petroleum resin comprising producing a highly aromatic resin in accordance with the process of claim 1 and hydrogenating said highly aromatic resin at a pressure of about 100 to 5000 p. s. i. g. and at a temperature of about 100° to 750° F. to produce the light colored highly aromatic petroleum resin.

3. A process for preparing a highly aromatic hydrocarbon resin which comprises: recovering the liquid polymer by-product from the Friedel-Crafts polymerization of a steam-cracked petroleum fraction boiling between about 20° C. and 140° C., said liquid polymer boiling between about 350° and 800° F. and containing about 20 to 50 wt. percent aromatic hydrocarbons; steam-cracking said liquid polymer at conditions adapted to yield a cracked fraction boiling between about 250° and 500° F.; recovering said cracked fraction boiling between about 250° and 500° F.; contacting said cracked fraction with a Friedel-Crafts polymerization catalyst at a temperature between about −50° C. and +200° C.; and recovering the resulting highly aromatic resin.

4. In a continuous process for preparing a substantially non-aromatic petroleum resin by the Friedel-Crafts polymerization of a steam-cracked virgin petroleum fraction boiling between about 20° C. and 140° C., the improvement which comprises: recovering the liquid polymer by-product boiling between about 350° and 800° F. and containing 20 to 50 wt. percent aromatic hydrocarbons; steam-cracking said liquid polymer at a temperature between about 1000° and 1500° F. in the presence of about 60 to 95 mole percent steam; recovering the resulting steam-cracked highly aromatic fraction boiling between about 250° and 500° F.; contacting said highly aromatic fraction with about 0.5 to 10 wt. percent Friedel-Crafts polymerization catalyst at a temperature between about −50° and +200° C.; and recovering the resulting highly aromatic resin.

5. A process according to claim 4 wherein said liquid polymer and the virgin petroleum fraction are concurrently steam-cracked in the same steam-cracking unit.

6. A process according to claim 4 wherein said liquid polymer and the virgin petroleum fraction are steam-cracked in separate steam-cracking units, the resulting steam-cracked streams are fractionated concurrently in the same fractionating unit, the C$_5$–C$_8$ fraction from said fractionating unit is polymerized to produce said substantially non-aromatic petroleum resins, and the C₉—500° F. fraction from said fractionating unit is polymerized to produce said highly aromatic resin.

7. A process according to claim 4 wherein said liquid polymer and the virgin petroleum fraction are steam-cracked in separate steam-cracking units, the resulting steam-cracked streams are fractionated in separate fractionating units, the C₅–C₈ fractions from both fractionating units are polymerized to produce said substantially non-aromatic petroleum resins, and the C₉—500° F. fractions from both fractionating units are polymerized concurrently in the same reaction to produce said highly aromatic resin.

References Cited in the file of this patent

UNITED STATES PATENTS

| | | |
|---|---|---|
| 2,062,845 | Thomas et al. | Dec. 1, 1936 |
| 2,387,259 | Hall et al. | Oct. 23, 1945 |
| 2,500,755 | Jones | Mar. 4, 1950 |
| 2,712,538 | Wadsworth | July 5, 1955 |